(12) United States Patent
Hanson et al.

(10) Patent No.: US 6,291,026 B1
(45) Date of Patent: *Sep. 18, 2001

(54) METHOD FOR FORMING A MOLD-RELEASE COATING

(75) Inventors: Bror H. Hanson, New Baltimore, MI (US); Douglas L. Hunter, Angleton, TX (US)

(73) Assignee: Polymerit, New Baltimore, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/608,813

(22) Filed: Jun. 30, 2000

Related U.S. Application Data

(63) Continuation of application No. 08/848,819, filed on Apr. 30, 1997, now Pat. No. 6,117,495, and a continuation-in-part of application No. 08/350,712, filed on Dec. 7, 1994, now abandoned, which is a continuation of application No. 08/114,698, filed on Sep. 1, 1993, now abandoned.

(51) Int. Cl.$^7$ .................................................. B05D 1/04
(52) U.S. Cl. .................... 427/470; 427/133; 427/135; 427/476; 427/485
(58) Field of Search ................... 427/133, 135, 427/181, 202, 230, 236, 239, 470, 476, 485, 486, 416; 264/338, 255; 425/91, 96, 98, 100; 106/38.22, 38.25, 38.09

(56) References Cited

U.S. PATENT DOCUMENTS

| | | |
|---|---|---|
| 2,795,512 | 6/1975 | Sherratt et al. . |
| 3,101,244 | 8/1963 | Hood et al. ............................. 18/48 |
| 3,127,457 | 3/1964 | Di Pinto ................................ 264/54 |
| 3,279,936 | 10/1966 | Foresteck ............................... 117/2 |
| 3,341,646 | 9/1967 | Britain ................................. 264/213 |
| 3,492,394 | 1/1970 | Heine ................................... 264/297 |
| 3,598,626 | 8/1971 | Probst et al. . |
| 3,624,190 | 11/1971 | Cekada, Jr. ............................ 264/41 |
| 3,671,007 | 6/1972 | Bailey et al. .......................... 249/114 |
| 3,883,628 | 5/1975 | Martin ................................... 264/54 |
| 3,925,530 | * 12/1975 | Rees . |
| 3,928,673 | 12/1975 | Pardee et al. .......................... 427/135 |
| 3,931,381 | 1/1976 | Lindberg .............................. 264/45.5 |
| 3,995,979 | 12/1987 | Fedrigo . |
| 4,110,119 | 8/1978 | Boehmke et al. ................... 106/38.24 |
| 4,118,235 | 10/1978 | Horiuchi et al. .................... 106/38.22 |
| 4,131,662 | * 12/1978 | Cekoric et al. . |
| 4,281,032 | * 7/1981 | Escott et al. . |
| 4,308,063 | 12/1981 | Horiuchi et al. .................... 106/38.22 |
| 4,312,672 | 1/1982 | Blahak et al. ....................... 106/38.22 |
| 4,427,803 | 1/1984 | Fukui et al. ........................... 523/402 |
| 4,681,712 | 7/1987 | Sakakibara et al. .................... 264/24 |
| 4,892,585 | 1/1990 | Fischer et al. ...................... 106/38.22 |
| 5,021,109 | 6/1991 | Petropoulos et al. ................. 156/137 |
| 5,028,366 | 7/1991 | Harakal et al. ......................... 264/51 |
| 5,035,849 | 7/1991 | Uemura et al. ....................... 264/255 |
| 5,039,435 | 8/1991 | Hanano ............................... 106/38.22 |
| 5,212,245 | 5/1993 | Franks et al. .......................... 525/223 |
| 5,628,956 | * 5/1997 | Theusner et al. . |

FOREIGN PATENT DOCUMENTS

| | | |
|---|---|---|
| 2621255 | 11/1977 | (DE) . |
| 2193143 | 3/1988 | (GB) . |
| 5648276 | 9/1979 | (JP) . |
| 5964318 | 5/1982 | (JP) . |
| 5910691 | of 1983 | (JP) . |

OTHER PUBLICATIONS

Hawley's Condersed Chemical Dictionary, 13$^{th}$ Edition, Revised by Richard J. Lewis Sr., pp. 897–898, 906, 1178, 1997.*

"Hawley's Condensed Chemical Dictionary" Richard J. Lewis, Sr., 13th addition, pp. 897–898.

* cited by examiner

Primary Examiner—Fred J. Parker
(74) Attorney, Agent, or Firm—Bliss McGlynn, P.C.

(57) ABSTRACT

A method for forming a mold-release coating on a mold surface includes providing a coating of material on the mold surface. The coating of material has a surface which is capable of accepting and retaining a release powder. The method also includes depositing the release powder onto the coating of material. The release powder embeds the coating of material upon deposition thereby forming a mold-release coating.

20 Claims, No Drawings

METHOD FOR FORMING A MOLD-RELEASE COATING

CROSS-REFERENCE TO RELATED APPLICATIONS

This application is a continuation of Ser. No. 08/848,819 filed Apr. 30, 1997 U.S. Pat. No. 6,117,495 and a Continuation-In-Part of U.S. application Ser. No. 08/350,712, filed Dec. 7, 1994, abandoned, which is a Continuation of application U.S. Ser. No. 08/114,698, filed Sep. 1, 1993, abandoned.

BACKGROUND OF THE INVENTION

1. Field of the Invention

The present invention relates generally to mold-release agents for mold surfaces and, more particularly, to a method for forming a mold-release coating using a release powder electrostatically deposited on a mold surface.

2. Description of the Related Art

In the process of making molded polymeric foam parts, such as polyurethane foam parts, foam precursor material is first admitted into a mold and, subsequently, the foam precursor material is caused to foam and cure, taking on the shape of the mold's interior.

The interior surfaces of the mold are usually coated with a wax mold-release agent before every molding operation. The wax mold-release agent allows complete and easy removal of the molded part. Typically, the wax mold-release agent is spray-applied onto the mold surface.

Current wax mold-release agents include solvent-based and water-based agents. Solvent-based wax mold release agents are applied to the interior surface of molds and allowed to dry. These agents are applied before every molding operation or frequently between molding operations. However, during the drying step, volatile organic compounds are evolved, requiring precautions to avoid human exposure. With the increased awareness of environmental protection, such solvent-based wax mold-release agents are becoming obsolete.

Water-based wax mold-release agents result in substantially less evolution of volatile organic compounds than do the solvent-based wax mold-release agents. Water-based wax mold-release agents are also applied before every molding operation or frequently between molding operations. Although they contain much less volatile organic compounds than solvent-based wax mold-release agents, water-based wax mold-release agents are not without problems.

One problem with water-based wax mold-release agents is that they still contain a small amount of volatile organic compounds which are evolved during the coating process. Secondly, water-based wax mold-release agents gradually build-up on the mold surface causing undesirable changes in the mold's dimensions or contours. Thirdly, water-based wax mold-release agents are more expensive than solvent-based wax mold-release agents. Lastly, water-based wax mold-release agents require longer drying times than do solvent-based wax mold-release agents.

A problem with using as a mold release agent is that there remains wax deposit on the surface of the part after removal, along with was build-up on the mold itself.

SUMMARY OF THE INVENTION

It is, therefore, one object of the present invention to provide a method for forming a mold-release coating on a mold surface without using a wax.

It is another object of the present invention to provide a method for forming a mold-release coating on a mold surface which requires less time, labor, and materials than do prior art methods.

It is yet another object of the present invention to provide a method for forming a mold-release coating on a mold surface which reduces the amount of volatile organic compounds evolved relative to using solvent-based wax mold-release agents.

It is yet another object of the present invention to provide a method for forming a mold-release coating on a mold surface which does not deleteriously alter the mold's dimensions or contours.

It is still another object of the present invention to provide a mold release coating which significantly reduces flammability as compared to wax mold-release agents.

It is a further object of the present invention to provide a mold release coating which increases the ability to adhere a cloth material to a foam molded part.

It is still a further advantage of the present invention to provide a mold release coating that allows a foam molded part to be painted.

It is a further object of the present invention to provide a mold release coating which minimizes periodic cleaning of the molds.

To achieve the foregoing objects, the present invention is a method for forming a mold-release coating on a mold surface. The method includes two basic steps: (a) providing a base coat of material on the mold surface and (b) electrostatically depositing a release powder onto the base coat of material. The base coat of material has a surface which is capable of accepting and retaining the release powder. Upon deposition of the release powder, the release powder embeds the base coat material thereby forming a mold-release coating. The base coat may periodically be applied to the mold, as properties or a portion thereof diminishes. The release powder is electrostatically applied before each molding operation.

A more specific embodiment of the present invention includes providing a base coat of solvent base wax to the mold which substantially remains on the mold during subsequent molding operations.

One advantage of the present invention is that a method for forming mold-release coatings is provided without using a wax as a mold release agent. Another advantage of the present invention is that the method provided for forming mold-release coatings requires less time, labor, and materials than do prior art methods. Yet another advantage of the present invention is that the method provided for forming mold-release coatings uses less volatile organic compounds than do methods which use conventional solvent-based wax mold-release agents. Still another advantage of the present invention is that the method provided for forming mold-release coatings does not deleteriously alter the mold's dimensions or contours by wax build-up as do wax mold-release agents. A further advantage of the present invention is that the mold-release coatings significantly reduce flammability and increase the ability to adhere a cloth material and paint a foam molded part as compared to wax mold-release agents. Yet a further advantage of the present invention is that the mold-release coatings reduce periodic cleaning of the molds because there is no wax build-up on the surface of the part.

DESCRIPTION OF THE PREFERRED EMBODIMENT(S)

One embodiment of the method of the present invention generally entails the basic steps of providing a coating of hardened polymeric material on a mold surface and depositing a release powder onto the coating of hardened polymeric material.

Suitable hardened polymeric materials include thermoset materials, such as epoxy resins. Preferably, the hardened polymeric material is fillerless and maintains hardness at temperatures of at least about 60° C. Typically, the coating of hardened polymeric material is at least about 0.6 mm and at most about one (1) mm thick.

One method for providing a coating of hardened polymeric material on a mold surface involves coating an existing mold surface with liquefied hardenable polymeric material and allowing the polymeric material to harden. A second method for providing a coating of hardened polymeric material on a mold surface involves forming a mold using hardenable polymeric material at least at the mold surface.

In the method which involves coating an existing mold surface with liquefied hardenable polymeric material, the surface of the existing mold should be cleaned and textured to maximize the adhesion of the hardened polymeric material to the mold surface.

A conventional mold used today is formed of aluminum and, after use, will have an interior surface impregnated with a wax mold-release agent. To coat such a mold according to the present invention, it is desirable to first remove the impregnated wax. To remove the wax and prepare the surface for applying the polymeric material, the mold surface may be (a) grit blasted with, e.g., 50# aluminum oxide grit, (b) then heated to 500 to 800° F. using, e.g., an acetylene torch with a heater tip, (c) then brush blasted to remove any residue left from the heating step, (d) then degreased with an aggressive solvent, such as 1,1,1-trichlorethane, and, finally, (e) scrubbed with a solvent and a bristle brush.

Another conventional mold used today is formed of plastic and, after use, will have an interior surface impregnated with a wax mold-release agent. With plastic molds, a different surface preparation procedure should be used. The preparation procedure may include (a) cleaning the mold surface with a solvent which will remove the mold-release wax but will not damage the mold, (b) then blasting the mold surface with a moderately aggressive media, e.g., TRIN MIX #3, available from Trinity Tool, Fraser, Mich., and (c) degreasing the blasted surface with a solvent that will not damage the mold.

Once the mold surface has been prepared for coating, a coating of liquefied hardenable polymeric material may be applied by any suitable method, e.g., by brushing or by spraying. Preferably, the mold is mounted on a device which slowly rotates the mold about a horizontal axis while it is being coated, e.g., at a rate of about two (2) RPM. The rotation allows the hardenable polymeric material to flow into a uniform coating. Once the desired amount of hardenable polymeric coating has been applied to the mold surface, the rotation may be increased to about three (3) RPM's and continued until the polymeric material hardens. Generally, epoxy resins harden in about two (2) hours. The hardened polymeric material is then allowed to cure completely. Epoxy resin typically fully cures to a glossy, non-tacky finish overnight at room temperature.

As mentioned above, molds can be prepared which incorporate the hardened polymeric material at the interior mold surface. A process for forming such a mold may include: (a) coat a model of the part desired with a release agent, (b) then apply liquefied hardenable polymeric material to the release-agent-coated model to a thickness of about one (1) mm, (c) allow the liquefied hardenable polymeric material to harden, (d) apply additional liquefied hardenable polymeric material to the model coated with hardened polymeric material to a thickness which finishes the construction of the mold, (e) allow the additional liquefied hardenable polymeric material to cure, (f) post-cure the mold at elevated temperatures, if desired, and (g) separate the mold from the model. The polymeric material used to finish the construction of the mold may be the same material as the mold surface layer, if desired.

After providing a coating of hardened polymeric material to the mold surface, the surface of the hardened polymeric material is conditioned to render it capable of accepting and retaining powder. One method of conditioning the surface of the hardened polymeric material entails two basic steps: (a) contacting the hardened polymeric material with a conditioning agent which renders the hardened polymeric material capable of accepting and retaining release powder and (b) heating the conditioning agent-treated polymeric material to at least about 55° C. The conditioning of the hardened polymeric material need only be performed once in the lifetime of the mold.

Suitable conditioning agents include aggressive organic solvents, such as n-methylpyrrolidone, which is found in Formula #6089 Cleaner, available from Camie Campbell, St. Louis, Mo. Conditioning with an organic solvent causes the hardened polymeric material to soften and become tacky and porous.

Contacting the hardened polymeric material with the conditioning agent may be accomplished by wiping the surface thereof once with a paper towel saturated with the conditioning agent. The amount of conditioning agent and the length of time of conditioning should be sufficient to render the hardened polymeric material capable of accepting and retaining powder. It is preferred that, after the wiping, the surface be cleaned immediately with any conventional cleaner or degreaser, e.g., those containing halogenated organic solvents, such as trichloroethane, trichloromethane, or carbon tetrachloride, to remove residue left from the conditioning step. Optionally, release powder may be applied to the conditioning agent-treated hardened polymeric material. Methods of applying release powder are discussed hereinbelow.

After the hardened polymeric material has been contacted with conditioning agent, the hardened polymeric material is preferably heated and release powder is subsequently applied to the heated coating. If epoxy resin is used as the polymeric material, the epoxy resin coating is heated to at least about 55° C., and, more preferably, about 60° C.

Once the hardened polymeric material has been conditioned, release powder is applied thereto prior to each molding operation. Release powder may be applied to the conditioned polymeric material using any suitable technique. For example, the release powder may be applied by dipping an applicator, such as a duster, sponge, or soft brush, into the release powder and applying the release powder to the surface of the conditioned polymeric material, using the applicator to work the powder into the conditioned polymeric material.

Alternatively, the release powder may be sprayed onto the conditioned polymeric material. The spraying may be done by air blasting a mixture of blast grit and release powder at the conditioned polymeric material. The release powder should adhere to the blast grit so that the blast grit transports it to the conditioned polymeric material. Upon blasting, some of the release powder will adhere to the conditioned polymeric material and some will fall with the blast media. A suitable blast grit to use is plastic beads, PX20/30, available from U.S. Technology Corporation, Canton, Ohio. The release powder may be blended with the blast grit at about one (1) weight percent based on the weight of the blast grit. A suitable air pressure for blasting is about ten (10) psi. Preferably, multiple coats of release powder are applied. Typically, about 0.1 to about 0.5 grams of the release powder are applied per one (1) square foot of mold surface.

An example release powder is a 50/50 weight mixture of two polytetrafluoroethylene resin powders, namely, "TEFLON" MP1000 and "TEFLON" MP1200, available from E.I. du Pont de Nemours & Co., Wilmington, Del., owner of the trademark "TEFLON". The mixture of the two "TEFLON"'s has a particle size ranging from about one (1) to about ten (10) microns.

The second embodiment of the present invention generally entails a method for forming a mold-release coating on a metallic mold surface which includes blasting the metallic mold surface with blasting media and applying release powder to the blasted metallic mold surface. The metallic mold may be formed of any metal, such as aluminum or steel.

To prepare the mold-release coating on the metallic mold surface, the metallic mold surface is first blasted with blasting media, e.g., aluminum oxide #220 grit. Subsequently, the metallic mold surface is cleaned and degreased with a liquid cleaner such as those containing halogenated organic solvents, e.g., trichloroethane, trichloromethane, or carbon tetrachloride. After cleaning the mold surface, release powder, such as the polytetrafluoroethylene powder, "TEFLON" 993, is applied to the cleaned surface. Application of the release powder may be performed by any of the techniques discussed above. One such technique includes brush applying several coats of release powder, wiping gently with a soft urethane sponge between applications. Preferably, application of the release powder is performed before every molding operation.

A third embodiment of the method of the present invention generally entails the basic steps of providing a base coat of material on the mold surface and electrostatically depositing a release powder onto the base coat of material. The base coat of material has a surface which is capable of accepting and retaining the release powder. Upon deposition of the release powder, the release powder embeds the base coat of material thereby forming a mold-release coating. The base coat may periodically be applied to the mold, as properties or portions thereof may be slightly diminished with each molding operation. The release powder is electrostatically applied before each molding operation.

One embodiment of providing the base coat of material on the mold surface includes providing a base coat of solvent base wax to the mold which substantially remains on the mold during subsequent molding operations. The base coat is generally a 0.1 to 3 mm, preferably 0.1 to 1 mm, built-up layer of solvent base wax that is always present when molding large quantities of production parts with spray wax. Periodically, such as once every ten parts, a normal application of solvent base wax is sprayed on the mold. Just before pouring each part, the release powder is electrostatically deposited on the base coat in the mold, generally 0.5 to 2 g.

Another embodiment of providing the base coat of material on the mold surface includes providing a base coat of wax containing no solvent or VOC's to the mold which substantially remains on the mold during subsequent molding operations. The wax is a powder form having a melting temperature in the range of approximately 140° F.–280° F. NORDSON equipment is used to melt and liquify the wax. The liquefied wax is a liquified solid and is deposited on the mold with a hot melt spray application using the NORDSON equipment. Just before pouring each part, the release powder is electrostatically deposited on the base coat in the mold.

One example of the release powder is provided hereafter. It should be appreciated that other formulations having similar characteristics may be used. For use in the electrostatically deposited powders, the release powder consists of: a base quantity of TEFLON® powder; a chemically reactive component that enhances release properties and also opens the surface cell pattern when molding urethane foam; and a surfactant to create a uniform surface on the part.

The mixing of a typical powder is as follows. The reactive component is mixed separately and is comprised of:
90 g Microthene F (fine powder)
135 g 6063A (liquid)
The reactive component may be propeller mixed using a slow speed mixer (100 rpm). The result is a viscous liquid.

The release powder is formed as follows:
800 g DuPont MP1000 TEFLON® powder
180 g of the previously mixed reactive liquid is added using a high shear propeller mixing blade;
20 g Protosol BMD surfactant is added using a high shear propeller mixing blade.

The release powder mixture is a slightly "wet" powder with particles ranging from 3 to 20 microns. The physical characteristics of the formulation are very good for electrostatic powder spray applications. The reactivity of this formulation is high and is suitable for use with MDI flexible urethane foam. A less reactive powder may be used with TDI flexible urethane materials.

The DuPont TEFLON® powder is available from TEFLON® Flouroadditives of DuPont Polymers, Wilmington, Del. The Microthene F (FN-510-00) powder is available from Quantum Chemical Company, Cincinnati, Ohio. The 6063A silicon liquid is available from Camie Campho, Inc., St. Louis, Mo. The Protosol BMD liquid is available from Synthron, Inc., Morganton, N.C.

Another example of the release powder is provided hereafter. It should be appreciated that other formulations having similar characteristics may be used. For use in the electrostatically deposited powders, the release powder consists of: a base material of polyethylene powder and a flow modifier of silica to improve flow characteristics of the base powder by breaking down electrostatic interaction.

The release powder is formed as follows:
95%–99.9% by weight Polywax 1000 (polyethylene)
0.1–5% by weight Aerosil 202 (siloxane modified fumed silica)
The Polywax 1000 and Aerosil 202 are mixed together with a high speed impeller using conventional equipment for mixing dry powders. The release powder mixture is a "dry" powder with particles approximately 60 microns.

The Polywax 1000 powder is available from Petrolite, Tulsa, Okla. The Aerosil 202 is available from Degussa, Akron, Ohio.

Accordingly, the method of the present invention is useful for forming mold-release coatings on mold surfaces. The molds may be used for forming various parts, such as foamed rigid or flexible polyurethane parts.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method for forming a mold-release coating on a mold surface, comprising:

providing a coating of material on the mold surface, the coating of material having a surface which is capable of accepting and retaining a release powder; and depositing the release powder onto the coating of material, the release powder embedding the coating of material upon deposition thereby forming a mold-release coating.

2. A method as set forth in claim 1 wherein the step of providing the coating of material comprises applying a base coat of solvent base wax to the mold.

3. A method as set forth in claim 2 including the step of periodically reapplying the base coat of solvent base wax to the mold.

4. A method as set forth in claim 2 wherein the step of depositing comprises electrostatically depositing the release powder onto the base coat prior to each molding operation.

5. A method as set forth in claim 1 wherein the step of providing the coating of material comprises applying a base coat with a wipe on paste solvent base wax.

6. A method as set forth in claim 1 wherein the step of providing the coating of material coat comprises applying a base coat with a spray on solvent base wax.

7. A method as set forth in claim 1 wherein the steps of providing the coating of material comprises applying a base coat as a hot liquefied wax.

8. A method as set forth in claim 2 wherein the base coat of solvent base wax is at least 0.1 mm thick.

9. A method as set forth in claim 1 wherein the release powder comprises a base material and a flow modifier.

10. A method as set forth in claim 9 wherein the base material is polyethylene.

11. A method as set forth in claim 9 wherein the flow modifier is silica.

12. A method as set forth in claim 1 including the step of heating the coating of material either before or after depositing the release powder.

13. A method as set forth in claim 1 wherein the coating of material comprises a hardenable polymeric material.

14. A method as set forth in claim 13 wherein the hardenable polymeric material is a thermoset material.

15. A method for forming a mold-release coating on a mold surface, comprising:

providing a coating of material on the mold surface, the coating of material having a surface which is capable of accepting and retaining a release powder; and depositing the release powder onto the coating of material, the release powder embedding the coating of material upon deposition thereby forming a mold-release coating;

wherein the coating of material comprises a hardenable polymeric material; and wherein the hardenable polymeric material is an epoxy resin.

16. A method as set forth in claim 13 wherein the hardenable polymeric material is at least 0.6 mm thick.

17. A method for forming a mold-release coating on a mold surface, comprising:

providing a coating of hardened polymeric material on the mold surface, the coating of hardened polymeric material having a surface which is capable of accepting and retaining a release powder; and depositing the release powder onto the coating of hardened polymeric material, the release powder embedding the hardened polymeric material upon deposition thereby forming a mold-release coating; and conditioning the surface of the coating of material to render it capable of accepting and retaining powder.

18. A method as set forth in claim 17 wherein the step of conditioning includes contacting the surface of the coating of material with an organic solvent.

19. A method as set forth in claim 1 wherein the release powder is formed of polytetrafluoroethylene.

20. A method for forming a mold-release coating on a mold surface, comprising:

blasting the mold surface with a blasting media;

depositing a coating of material on the mold surface, the coating of material having a surface which is capable of accepting and retaining a release powder; and depositing the release powder onto the coating of material.

* * * * *